United States Patent Office 3,577,534
Patented May 4, 1971

3,577,534
STABLE ORALLY ACTIVE HEPARINOID COMPLEXES
Teow Yan Koh and Kekhusroo Rustomji Bharucha, Toronto, Ontario, Canada, assignors to Canada Packers Limited, Toronto, Ontario, Canada
No Drawing. Continuation-in-part of application Ser. No. 650,621, July 3, 1967. This application Feb. 14, 1969, Ser. No. 799,521
Claims priority, application Canada, June 20, 1968, 22,996/68
Int. Cl. A61k *17/18*
U.S. Cl. 424—183                                    29 Claims

ABSTRACT OF THE DISCLOSURE

This invention relates to new stable heparinoid complexes which are absorbable through the mucous membranes of the mammalian body, prepared by reacting heparinic acid or other acid heparinoids with non-toxic organic compounds having weakly basic or amphoteric properties and characterized by a base strength $pK_b$ in the range of from about 7.0 to 12.5 or by an isoelectric point pI below about 9.7, to methods for preparing and using these new heparinoid complexes, and to therapeutic compositions containing them. Particularly suitable heparinoid complexes are those prepared from heparinic acid and amino acids having an isoelectric point pI below about 9.7.

---

This application is a continuation-in-part of application Ser. No. 650,621, filed July 3, 1967 now U.S. Pat. No. 3,506,642.

BACKGROUND

Natural heparin, heparin derivatives and synthetically sulfated polysaccharides, all of which will be referred to hereinafter as heparinoids, have heretofore been prepared and used primarily in the neutral sodium salt form. This is the form of heparin which is presently employed in anticoagulant therapy. However, therapeutic use of these materials is limited by the need to administer them parenterally, since they are inactive or only slightly active per se by other routes. In view of the long established reputation of heparinoids as safe and effective blood anticoagulants and/or antilipemic agents, a great deal of research has been devoted toward the development of adjuvants, derivatives and other expedients in an effort to render the known heparinoids absorbable through the intestinal walls so that they can be orally administered. However, this research has had limited success to date.

In the copending United States application Ser. No. 561,346 of Teow Yan Koh, filed June 29, 1966, now U.S. Pat. No. 3,482,014, it was disclosed that heparinic acid per se readily passes through the intestinal walls to provide an extremely high anticoagulant activity. The free acid form of heparin would, therefore, be an excellent anticoagulant, but unfortunately its stability is poor. Heparinic acid begins to decompose almost immediately and is difficult to isolate or handle. It was found by Koh that by partially satisfying the free acid groups of heparinic acid by reaction with a base, e.g. sodium or potassium hydroxide or strong organic bases, such as choline, to provide an acid salt, the stability was improved and some of the heparinic activity on oral administration could be retained. The acid salts of heparinic acid, such as the sodium, potassium and choline acid salts, are absorbable from the mammalian intestine to a useful extent, though less readily than heparinic acid, with the amount of absorption being inversely proportional to the cationic content of the salt. However, the stability of these acid salts also decreases with decreasing cationic content so that the formulation is necessarily a compromise between stability and heparinic activity.

SUMMARY OF THE INVENTION

We have now discovered that heparinic acid forms salts or complexes (hereinafter collectively designated as heparinoid complexes) with a number of weakly basic or amphoteric organic compounds to provide products which are not only quite stable but which when administered to any mucous membrane of the mammalian body results in systemic anticoagulant and/or antilipemic effect of high order. Use of the complexes of the invention is in the fields for which heparin therapy has already been established and, for example, may be in in the veterinary field for therapeutic treatment of animals. Modes of administration of the new complexes include oral administration, administration by rectal, urethral or vaginal route and administration to the respiratory system.

The expression "oral administration," as used herein, means administration by mouth and includes introduction of therapeutic compositions containing the new heparinoid complexes into the sublingual or buccal regions for absorption therefrom as well as the administration in the form of enteric compositions for release of the heparinoid substance in the intestine for absorption through the intestinal walls. Rectal administration is accomplished by means of enemas, injectable ointments or suppositories containing the active substance. Respiratory administration is accomplished by means of sprays or mists for inhalation.

We have further discovered that there is a correlation between the basicity of the basic or amphoteric reactant and the stability-absorbability of the resulting heparinoid complex. Reactants which are too strongly basic, such as the alkali metal bases and the aliphatic amines provide heparinoid complexes which are stable but not readily absorbed. Reactants which are too weakly basic, such as urea, pyrimidine and acetamide provide heparinoid complexes which are very active but unstable under normal storage conditions, and quickly lose their heparinic activity.

We prefer to express the requisite basicity in terms of $pK_b$ values for bases and in terms of pI values for the amphoteric compounds. Therefore, according to the present invention, heparinic acid and related heparinoids having free acid groups are stabilized without substantial loss of their oral effectiveness by forming complexes of the acids with certain non-toxic organic compounds characterized by a base strength $pK_b$ in the range of from about 7.0 to 12.5 or by an isoelectric point pI below about 9.7.

Detailed description

It will be understood that heparin is a very complex molecule, with a structure which has not been completely elucidated. It is tentatively identified as a sulfated copolymer consisting of alternating 1–4α linked glucosamine and glucuronic acid residues. In accordance with the invention, the acid form of heparin or related heparinoid is combined with one of a series of weak bases or amphoteric substances, which in themselves are not simple. Therefore, the specific structure of the resulting product cannot be stated with certainty and for this reason the word "complex" is used to embrace salts as well as more complex structures which may be formed.

For purposes of simplification, a schematic representation of the repeating tetrasaccharide unit of heparin (sodium salt) is shown below:

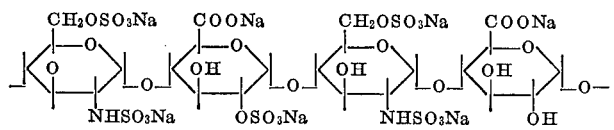

Treatment of sodium heparinate with an acidic ion exchange resin removes the sodium and gives heparinic acid. The conversion to heparinic acid confers oral activity on the molecule but at the same time makes it unstable. We believe that this instability probably arises by autocatalytic destruction of the acid labile sulfonic and sulfate groups and glycosidic linkages. However, whatever the cause of such instability, we have found that stabilization can be achieved by preparation of new complexes which unexpectedly are absorbable through mucous membranes by reaction of the acid heparin with the selected weakly basic or amphoteric substances. It is found that heparinic acid, being a strong acid, forms stable complexes even with the relatively weakly basic substances. Salt or complex formation is believed to be involved with at least the sulfamic and sulfate groups of heparinic acid. In pertinent cases, as with amino-amides (e.g. nicotinamide), stability may be further increased by hydrogen bond formation through the amide linkages.

The complexing agents suitable for the purposes of the present invention, and which yield complexes with heparinic acid and other acid heparinoids, resulting in good stability coupled with high adsorption activity, are those organic bases which have a base strength $pK_b$ in the range of from about 7.0 to 12.5, preferably about 9.0 to 12.5, and those organic amphoteric compounds which have an isoelectric point pI below about 9.7. Amphoteric substances over the range of from about 2.7 to 9.7 have been successfully tested and the criticality of the lower limit has not been determined. Specific examples include most of the amino acids which occur in nature or which have been isolated from proteins, e.g. alanine, asparagine, aspartic acid, cysteine, cystine, glutamic acid, glutamine, glycine, histidine, hydroxyproline, isoleucine, leucine, methionine, phenylalanine, proline, serine, threonine, tryptophane, glycylglycine, glycylvaline, aspartyltyrosine, tyrosine and valine, derivatives and metabolic products or natural amino acids, including diiodotyrosine, α-aminobutyric acid, nicotinic acid, nicotinamide, α-aminolaevulinic acid, imidazolelactic acid, creatine, phosphocreatine, α-butyrobetaine and glycine-betaine; and synthetic amino acids, such as anthranilic acid, p-aminobenzoic acid, γ-aminoacetoacetic acid, 4-aminobutyl phosphoric acid and aminoethylphosphoric acid. The aforementioned amino acids may be in the D-, L- or DL- form. The amino acids isolated from proteins are defined herein as those listed in "Organic Chemistry" by Fieser and Fieser (2nd ed. 1950), pages 431 and 432. Those which fall within the $pK_b$ or pI ranges above are suitable for purposes of the invention. Other compounds within the $pK_b$ range given above, and which may be classified as organic bases are:

| Compound: | $pK_b$ |
|---|---|
| Imidazole | 7.05 |
| Pyridine | 8.75 |
| 3-amino-cinnoline | 10.3 |
| 2-aminothiazole | 8.6 |
| 1,3-diamino-1,3-bishydroxyiminopropane | 9.3 |
| 1-diprop-2-ynylamino-prop-2-yne | 10.9 |
| 2-trimethylsilylmethylaminopropane | 10.8 |
| Purine | 11.7 |
| 4-ureidosulphonylaniline | 12.2 |
| 2-ethoxycarbonylaniline | 11.8 |
| 3-amino-biphenyl | 9.7 |
| 2-amino,4,6-dimethylpteridine | 11.3 |
| 2-amino-6,7-dimethylpteridine | 10.6 |
| 2-aminoquinoxaline | 10.1 |
| 2,3-diaminoquinoxaline | 9.3 |
| 2-aminoquinazoline | 9.3 |
| 1,4-dihydro-1-methyl-4-oxo-quinazoline | 10.9 |
| 1,2,4-triazole | 11.7 |
| 2-aminopyrimidine | 10.6 |
| 5-amino-4-methylpyrimidine | 10.9 |
| 1-phenylpyrrolidine | 9.7 |
| Methylindanylamino-indan | 9.4 |
| O-aminohydroxymethane | 9.4 |
| Semicarbazide | 10.4 |
| N-methyl-1,4-benzoquinone-imine | 10.1 |
| 1,4-benzoquinoneimine | 10.1 |
| N-benzyl-1,4-benzoquinoneimine | 11.2 |
| Thioflavine T | 11.3 |
| N-methylcytidin | 10.1 |
| Biliverdine | 9.0 |
| 2,4,2′,4′,2″-pentamethoxytriphenylcarbinol | 12.2 |
| Rhodamine B | 10.8 |

It will be understood that the invention is not limited to these specific examples and that those skilled in the art will be able to select many related complexing agents having a base strength or isoelectric point within the ranges given.

Compounds such as urea, pyrimidine and acetamide are weak bases with a $pK_b$ value above the limit of 12.5. These weak bases readily form complexes with heparinic acid which provide significant increases in blood clotting time by absorption through the mucous membranes. However, the stability of these complexes is quite low, decomposition and loss of heparinic activity at room temperature beginning within 20 days. Dimethylamine and choline, on the other hand, are stronger bases with a $pK_b$ value below the limit of 7.0. While these compounds form stable complexes with heparinic acid, the resulting complexes do not provide a significant rise in the level of blood clotting time. Likewise, lysine which is an amino acid outside the range of isoelectric points of the preferred complexing agents will not provide a complex showing a significant rise in the level of blood clotting time.

While we have referred to heparinic acid in the above description, it will be understood that the same principles apply to heparinic acid derivatives and related heparinic compounds (heparinoids) which have acid groups and which as salts with strong bases are orally inactive. Thus, OH and/or carboxyl protected heparinic acid derivatives when stabilized by the present invention also provide absorbable heparin preparations. Acid salts of heparin which, although possessing useful absorbable heparinic activity, are of undesirably low stability and can be made more stable by the process of the present invention. Here a portion of the free acid groups are satisfied by a cation of a strong base with the other acid groups being satisfied by salt formation or complexing with the complexing agents of this invention. Related heparinoids such as sodium dextran sulfate which are normally ineffective orally can be treated to provide free acid groups and, like heparinic acid, can be stabilized by reaction with the selected organic complexing agents. While anticoagulant activity has been referred to above, heparinoid compounds which possess selective or additional antilipemic activity can also be made absorbable by the present invention.

The preparation of the heparinoid complexes in accordance with the invention is quite simple. Thus, the sodium or other cation is removed from sodium heparinate or other available heparinoid salt, with an ion exchange resin and the effluent is collected and is reacted with the complex forming agent. Enough of the latter is used to neutralize or react with all of the sulfamic and sulfate groups and a slight excess, for example 10%, may be used to insure complete reaction. The product is then isolated in the form of a white powder by lyophilization or precipitated from aqueous solution with a water-miscible organic solvent. It can be converted to therapeutic composition form. Organic solvent precipitation, e.g. by addition of an alcohol or ketone solvent, has the advantage of producing an amorphous solid with free-flowing characteristics which is more easily handled than the fluffy powder obtained by lyophilization. If desired, the heparinic acid, after passing through the ion exchange in hydrogen form, can be collected into another vessel containing resin in hydroxyl form to selectively mop up any traces of inorganic acid which may have formed by the hydrolysis of the heparinic acid. This, however, is merely a precautionary measure and does not constitute an essential part of the invention.

Suitable ion exchange resins are commercially available. Different types of ion exchange resins and different techniques may be employed. For example, strongly acidic cationic exchange resins, such as the nuclear sulfonated ion exchange resins described in U.S. Pat. No. 2,366,007, may be used in the hydrogen form in excess of the theoretical amount for direct production of heparinic acid from sodium heparinate solution. Sodium or other acid heparinates may be prepared by partial neutralization of heparinic acid by addition of sodium hydroxide or other appropriate base.

The new heparinoid complexes are in water-soluble solid form so that they can be readily formulated into powders, pills, lozenges, tablets, capsules, ointments, liquids or other suitable form. Where the compositions are to be swallowed and absorption is to take place in the intestine, the compositions are given an enteric coating. The new heparinoid complexes in the aqueous medium of the mouth or gastrointestinal system or in contact with the moist linings of the respiratory tract, provide the active component in a form which can be absorbed through the mucous membranes of these regions.

Dosage units for swallowing and intestinal absorption may be provided with an enteric coating of any conventional formulation (e.g. the procedure of Remington's Practice of Pharmacy or of U.S. Pat. No. 3,126,320). Preparation of buccal or sublingual tablets and of rectal enemas, suppositories and ointments as well as nasal mists and inhalants is easily accomplished. The heparinoid complexes may be administered in relatively pure form, but it is to be understood that they may be combined with inert diluents and carriers such as starch, sugar, various stearates and carbonates, kaolin, lubricants, solvents and other pharmaceutical adjuvants and excipients. For example, a suppository form may be made from high viscosity polyethylene glycol 4000, water and heparinoid complex, the latter being present in the amount of up to 50% or more. Various acceptable solvents may be used for the solution and inhalant spray or mist forms, including water and isotonic saline.

The particular dosage, or range for the dosage, which will be employed in treating a mammalian subject with a heparinoid complex in accordance with the present invention will vary in accordance with a number of factors but can be readily determined by those skilled in the art with respect to a selected complex and subject's need. The absorbable anticoagulant activity per mg. will vary with the selected complexing agent, but the heparinic activity of each is easily determinable by simple assay. Tablets, powders, ointments, liquids, sprays or mists administered to the mucous membrane areas in sufficient dosage to provide approximately 100 to 20,000 anticoagulant units per kilogram of body weight are contemplated. In the dog, sublingual administration at a level of 3,000 units/kg. provided a significant prolongation of blood clotting time. Dosages in the same general range administered by other routes as described herein, likewise significantly increase blood clotting time. Significant lipid clearing activity is obtained by dosages of the same order.

What is required of an effective therapeutic dosage is that it at least doubles the normal blood coagulation time or lipid clearing activity, of the subject, and with this basic requirement known, a suitable dosage can readily be determined for each individual heparinoid complex. Because administration to the mucous membranes does not have the disadvantages attendant upon parenteral administration, administration can be more frequent to effect a more closely controlled and sustained level of anticoagulant activity in the blood. In general, it is contemplated that the dosage units of the pharmaceutical preparations will contain sufficient of the heparinoid complex to provide a heparin activity of from about 500 to 50,000 U.S.P. anticoagulant units, and that these would be administered in sufficient quantity to provide a dosage of 100 to 20,000 anticoagulant units per kilogram of body weight with repeat dosages several times daily as may be required.

The following is an illustrative general method for preparing heparinoid complexes from a commercial sodium heparinate. The assays for anticoagulant activity in all instances referred to below were carried out by the method described in U.S. Pharmacopeia XVII.

EXAMPLES 1–20

Preparation of heparinic acid complexes

Sodium heparinate (6.25 g.) containing ca. 12% sodium was percolated through a 2 x 30 cm. column containing 40 ml. of a nuclear sulfonated polystyrene cation exchange resin ($H^+$ form). The effluent was collected in a beaker containing 10 ml. of a polystyrene trimethyl benzylammonium type anion exchange resin ($OH^-$ form) to remove any free sulfate ions, and the suspension was stirred for 10 minutes at room temperature. The resin was filtered off and the aqueous phase was added to a weighed amount of a selected complexing agent. On lyophilization, white powders were obtained, which were assayed for anticoagulant activity at spaced intervals of time.

By the procedure given above, heparinoid complexes were prepared as set forth in the following table.

TABLE I

| Example number | Complexing agent | Ratio by weight of heparinic acid to complexing agent | In vitro, anticoagulant activity, μ/mg. | |
|---|---|---|---|---|
| | | | Starting sodium heparinate | Complex based on heparin content |
| 1 | Urea | 1.00 | 114 | 102 |
| 2 | Pyrimidine | 2.06 | 164 | 182 |
| 3 | Acetamide | 4.17 | 165 | 160 |
| 4 | Purine | 1.67 | 164 | 180 |
| 5 | Nicotinamide | 1.75 | 147 | 140 |
| 6 | do | 1.58 | 165 | 162 |
| 7 | Pyridine | 2.57 | 164 | 165 |
| 8 | Imidazole | 3.18 | 164 | 162 |
| 9 | Choline | | 140 | 130 |
| 10 | DL-aspartic acid | 1.63 | 164 | 165 |
| 11 | L-glutamic acid | 1.57 | 164 | 179 |
| 12 | Anthranilic acid | 1.54 | 150 | 166 |
| 13 | p-aminobenzoic acid | 1.49 | 150 | 162 |
| 14 | DL-asparagine | 1.65 | 164 | 160 |
| 15 | L-glutamine | 1.49 | 164 | 181 |
| 16 | L-valine | 1.81 | 164 | 177 |
| 17 | Glycine | 3.07 | 164 | 179 |
| 18 | β-alanine | 2.66 | 164 | 179 |
| 19 | L-histidine | 1.61 | 164 | 141 |
| 20 | L-lysine | 1.31 | 164 | 177 |

EXAMPLES 21–23

Preparation of sodium acid heparinate complexes

An aqueous solution of neutral sodium heparinate (164 U.S.P. anticoagulant μ/mg.) was mixed with an excess of strongly acidic cation exchange resin of the nuclear sulfonated polystyrene type in the acid form and contact was maintained for about 15 minutes. After separation of the aqueous heparinic acid phase from the resin beads by filtration, it was divided into portions to which different quantities of NaOH solution were added to partially neutralize the heparinic acid. To the resulting sodium acid heparinate solutions were added one of the complexing agents of the present invention. The following sodium acid heparinate complexes were prepared in this manner:

TABLE II

| Example number | Complexing agent | Ratio by weight of sodium acid heparinate to complexing agent | Sodium content based on heparin, percent | In vitro anticoagulant activity, μ/mg. | |
|---|---|---|---|---|---|
| | | | | Starting sodium heparinate | Complex based on heparin content |
| 21 | Nicotinamide | 2.13 | 2.4 | 164 | 180 |
| 22 | Urea | 1.03 | 2.4 | 164 | 160 |
| 23 | Anthranilic acid | 3.13 | 0.16 | 164 | 160 |

EXAMPLE 24

Glycine complex of dextran sulfuric acid

An amount of 3.0 g. sodium dextran sulfate (MW 16,200, heparin-like activity, 17 U.S.P. anticoagulant μ/mg.) was dissolved in 10 ml. $H_2O$. The solution was percolated through a 2 x 30 cm. column containing 30 ml. of nuclear sulfonated polystyrene cationic exchange resin, $H^+$ form. The effluent was immediately added to an aqueous solution containing 1.5 g. glycine, and then lyophilized. Upon lyophilization, a powder (glycine complex of dextran sulfuric acid) was obtained, yield 4.13 g., anticoagulant assay 14 U.S.P. μ/mg.

EXAMPLE 25

Acetone precipitation of glycine complex of heparinic acid

An aqueous solution of 2.0 g. sodium heparinate (150 U.S.P. anticoagulant μ/mg.) was percolated through a 2 x 30 cm. column containing 20 ml. nuclear sulfonated polystyrene cationic exchange resin, $H^+$ form. The effluent was immediately added to an aqueous solution containing 0.6 g. glycine. The total volume measured 145 ml. The solution was concentrated in vacuo at a bath temperature of up to 48° C. to 15–20% of its original volume. Four times its volume of acetone was added which caused an immediate fluffy precipitate to form. The precipitate was collected by centrifugation, yield 1.87 g., assaying at 118 U.S.P. anticoagulant μ/mg., based on total solids.

EXAMPLE 26

Methanol precipitation of glycine complex of heparinic acid

An aqueous solution of 5.0 g. sodium heparinate (150 U.S.P. anticoagulant μ/mg.) was converted to heparinic acid by percolating through a nuclear sulfonated polystyrene cationic $H^+$ form, resin bed. The effluent was added to 1.83 g. glycine. The volume was reduced by concentrating in vacuo at 48° C. to 10% its original. Four times its volume of methanol was added, causing a fluffy precipitate to form. The precipitate was collected by filtration, yield 3.97 g., assaying at 114 U.S.P. anticoagulant μ/mg., based on total solids.

EXAMPLE 27

Glycine complex of carboxymethyl ester of heparinic acid 6.25 grams of the carboxymethyl ester of sodium heparinate was converted to acid form by passage of a solution of same through a cation exchange resin in hydrogen form. The resulting acid form of the heparinoid was immediately complexed with 1.597 grams of glycine. Yield after lyophilization was 7.34 grams, U.S.P. anticogulant assay 99 μ/mg.

Tests illustrating asorption of new complexes through mucous membranes (1) Jejunal absorption of heparinic acid complexes (rabbit).—Ether-anesthetized rabbits, after overnight fasting, weighing 2–3 kg. were used. The abdomen was entered and the jejunum identified. Each heparinoid complex, in an amount adjusted to contain 39,000μ of anticoagulant activity, was dissolved in 2 ml. $H_2O$, and injected directly into the jejunum or instilled into an isolated, ligated loop of approximately 6 inches in length.

Blood samples were taken by cardiac puncture at time intervals after administration and the clotting time determined by the capillary method of Mayer [G. A. Mayer, J. Lab. Clin. Med. 49, 938 (1957)].

Table III shows the translocation of heparin into the blood when the complexes of Examples 1–20 were administered to the rabbit jejunum. The appearance of heparin in the blood was indicated by the prolongation of the whole blood clotting time from a normal clotting time of 8′45″.

TABLE III

| | Complexing agent | $pK_b$ | pI | Stability days room temperature | Blood clotting time 1 hour after administration |
|---|---|---|---|---|---|
| 1 | Urea | 13.82 | | 1–12 | >1,200′ |
| 2 | Pyrimidine | 12.77 | | 1–17 | >1,200′ |
| 3 | Acetamide | 12.60 | | 1–8 | |
| 4 | Purine | 11.70 | | >365 | >360′ |
| 5 | Nicotinamide | 10.65 | | >365 | >300′ |
| 6 | do | 10.65 | | >365 | >1,440′ |
| 7 | Pyridine | 8.75 | | >365 | 23′50″ |
| 8 | Imidazole | 7.05 | | >365 | 12′20″ |
| 9 | Choline | 5.06 | | >365 | 9′40″ |
| 10 | DL-aspartic acid | | 2.77 | >365 | >360′ |
| 11 | L-glutamic acid | | 3.22 | >365 | [1] 480′ |
| 12 | Anthranilic acid | | 3.52 | >365 | [1] 120′ |
| 13 | p-Aminobenzoic acid | | 3.65 | >365 | [1] 600′ |
| 14 | DL-asparagine | | 5.41 | >365 | >1,200′ |
| 15 | L-glutamine | | 5.65 | >365 | >360′ |
| 16 | L-valine | | 5.96 | >365 | [1] 240′ |
| 17 | Glycine | | 5.97 | >365 | >1,140′ |
| 18 | β-alanine | | 7.32 | >365 | >1,640′ |
| 19 | L-histidine | | 7.59 | >365 | 17′33″ |
| 20 | L-lysine | | 9.74 | >365 | 9′25″ |

[1] Approximate.

From the foregoing Table III it will be seen that the organic bases purine (4) and nicotinamide (5), which had a $pK_b$ within the range of 9.0 to 12.5 exhibit a stability greater than one year coupled with a blood clotting time 1 hour after administration far in excess of the therapeutic level. The stability limits for these complexes was not reached in the duration of the test period. Urea and pyrimidine which are weak bases having a $pK_b$ above 12.5 give complexes which, while exhibiting a high anti-clotting activity by adsorption, were substantially decomposed within 17 days. Acetamide, also outside of the $pK_b$ range likewise gives complex having an undesirably low stability. At the other end of the scale, the complex with choline, which is a strong base, had relatively little absorbable anti-clotting activity although satisfactory stability. Pyridine, near the lower end of the preferred range of $pK_b$ value, formed a complex which barely gave rise to therapeutic level of anti-clotting activity. In the amino acid group, all of the complexes demonstrated satisfactory heparinic stability in excess of 365 days, but L-lysine, having a pI value outside of the preferred range, exhibited very little absorbable anti-clotting activity in comparison with the preferred complexes.

Additionally, while not shown in Table III, the anti-clotting activity with heparinic complexes of L-glutamic acid, anthranilic acid with glycine were quite prolonged, the complex of heparinic acid with L-glutamic acid showing a blood clotting time of greater than 540 minutes 4 hours after administration, that of anthranilic acid showing a blood clotting time of greater than 420 minutes 2 hours after administration and that of glycine showing a blood clotting time of greater than 420 minutes 6 hours after administration. The glycine complex made by the method of Example 25 when injected intrajejunally to a rabbit was absorbed to provide a blood clotting time greater than 600 min. an hour after injection and by the sixth hour the clotting time was still above the therapeutic level.

(2) Jejunal absorption of sodium acid heparin complexes (rabbit).—The activity of sodium acid heparin complexes upon administration of 39,000 units to the rabbit jejunum is demonstrated in the following Table IV.

TABLE IV

| Complexing agent | Ratio by weight of sodium acid heparinate to complexing agent | Sodium content based on heparin, percent | Stability, days | Clotting time 1 hour after administration |
|---|---|---|---|---|
| Nicotinamide | 2.23 | 2.4 | >126 | 71'6" |
| Urea | 1.03 | 2.4 | >20 | 30'23" |
| Anthranilic acid | 1.54 | 0.16 | >66 | ¹ 120' |

¹ Approximate.

It will be seen from the foregoing table that the combination of sodium as part of the cation of the heparinic acid salt in combination with the complexing with the remaining free acid component with a weak base such as urea results in a more stable composition than the complex of heparinic acid and urea alone. However, the increased stability is at the expense of anticoagulant activity. All of the complexes of the acid salts shown here had satisfactory stability coupled with a therapeutic level of anti-clotting activity. Sodium acid heparinate (2.4% Na) complexes with nicotinamide and urea were absorbed to produce an increase of 8 and 3 fold the normal clotting time respectively an hour after administration.

(3) Jejunal absorption of complexes of dextran sulfuric acid (rabbit).—A quantity of the glycine complex of dextran sulfuric acid, prepared by the method of Example 24, equivalent to 20,000 anticoagulant units was dissolved in 4.0 ml. of $H_2O$. It was then instilled into a rabbit ligated intestinal loop in situ as described above, and the systemic anticoagulant activity measured as before. The blood clotting time was elevated to 13'00", from a normal of 8'45", an hour after administration. By the second hour it had exceeded 300'. The sodium salt of dextran sulfuric acid per se is not absorbed from the intestine.

(4) Jejunal absorption of heparinic acid complexes (dog).—The following Table V shows the systemic anticoagulation in the dog after intrajejunal injection of 2,850 units per kg. body weight of the glycine complex of heparinic acid.

TABLE V

| | Weight, kg. | Blood clotting time—hours after injection | | | | | |
|---|---|---|---|---|---|---|---|
| | | 0 | 1 | 2 | 3 | 4 | 5 | 5½ |
| Dog Number: | | | | | | | | |
| 1 | 13.7 | 8'19" | 38'35" | 17'12" | 15'00" | | 13'31" | |
| 2 | 10.5 | 8'45" | ¹ 450' | ¹ 390' | | 28'40" | | 9'35" |
| 3 | 10.8 | 9.35" | ¹ 480' | >660' | ¹ 360' | ¹ 240' | | |

¹ Approximate.
NOTE.—Blood samples were withdrawn by venous punctures.

In all of the animals the blood clotting time was prolonged significantly an hour after injection. The prolongation of therapeutic levels of anticoagulant activity by administration of dosage levels to the dog as shown exceeds four hours. The animals were anesthetized during the test and would be expected to show more uniform and enhanced response without anesthesia.

(5) Jejunal absorption of heparinic acid complexes (pig).—The following Table VI demonstrates the anticoagulant activity of the glycine complex of heparinic acid in an 84 kg. pig after intrajejunal injection to the anesthetized animal:

TABLE VI

| Dose, units per kg. body weight | Blood clotting time—hours after injection | | | | | | |
|---|---|---|---|---|---|---|---|
| | 0 | 1 | 2 | 3 | 4 | 5 | 6 |
| 600 | 8'47" | ¹ 175' | 54'07" | 40'62" | | 18'20" | 10'28" |

¹ Approximate.

This experiment was performed with a sample of glycine complex of heparinic acid which contained less than 0.05% sodium, and the blood samples were withdrawn by cardiac punctures. At a dose of 600 units per kg. body weight, absorption was sufficient to provide a prolonged blood clotting time of approximately 175', an hour after injection. The blood clotting time then gradually declined but significantly raised clotting time could still be detected at the sixth hour after injection. A therapeutically effective level of heparin in the blood was maintained for approximately 5½ hours. Similar experiments on other pigs resulted in a significant increase in blood clotting time.

(6) Jejunal absorption of glycine complex of carboxymethyl ester of heparinic acid (rabbit).—An anqueous solution of the glycine complex of carboxymethyl ester of heparinic acid, as prepared in Example 27, was injected into the jejunum of a rabbit to provide a dosage of 20,000 U.S.P. anticoagulant units. The blood clotting time (average of 2 tests) was raised to 4½ times its normal an hour after injection. The duration of systemic anticoagulation was of the order of about one hour.

(7) Gastrointestinal absorption from orally-administered tablets.—(a) Enteric-coated tablets containing glycine complex of heparinic acid were manufactured. Each tablet contained approximately 140 mg. of glycine complex of heparinic acid (120 U.S.P. anticoagulant $\mu$/mg.), 120 mg. Avicel (a binder) and 90 mg. Sterotex (a lubricant) and was coated with cellulose acetate phthalate.

Two tablets were fed to a female mongrel dog weighing 11.6 kg. Blood samples were withdrawn prior to feeding the tablets and at time intervals after feeding. The clotting time was determined by the capillary method of Mayer.

Following a lag period of 4½ hours, the blood clotting time was raised from a normal value of 5'12" to 8'40". A peak activity of 16'30" was attained after 5½ hours, after which the blood clotting time gradually declined. Prolonged blood clotting time was detected for at least 3 hours.

(b) Uncoated tablets containing 250 mg. of glycine complex of heparinic acid (118 U.S.P. anticoagulant units/mg.) and 65 mg. of polyvinylpyrrolidone were manufactured. Six of these tablets were fed to an 18 kg. dog. The blood clotting time before treatment was 8 minutes and 24 seconds. One and one-half hours after treatment the blood clotting time was unchanged. After two and one-half hours the blood clotting time was 14 minutes 30 seconds. After four hours the blood clotting time was 15 minutes 30 seconds, and at the end of six hours after treatment the blood clotting time had returned substantially to normal.

(c) Tablets of the same composition as in (b) were given an enteric coating and six tablets were fed to each of two dogs. The results were as follows:

| Time after treatment | Blood clotting time | |
|---|---|---|
| | Dog 1 (14.2 kg.) | Dog 2 (18 kg.) |
| 0 | 9'30" | 8'24" |
| 2 | 9'45" | 13'00" |
| 3 | | 13'15" |
| 3½ | 13'00" | |
| 4 | | 7'45" |
| 5 | 10'45" | 9'00" |
| 6 | 7'15" | 11'4" |
| 7 | | 11'00" |

(8) Sublingual absorption.—An amount of 280 mg. glycine complex of heparinic acid (120 U.S.P. anticoagulant $\mu$/mg.) in the powder form was placed under the tongue of a pentobarbital-narcotised female dog, weighing 11.6 kg. Blood samples were withdrawn by venous puncture at time intervals after administration and the clotting time determined by the capillary method of Mayer.

The blood clotting time was raised from a normal value of 10'30" to 18'45" at the second hour after administration. By the fourth hour, the blood time had returned to the normal value.

It is well known that sodium heparinate per se is not absorbed from the buccal cavity.

(9) Rectal absorption.—An aqueous solution containing 50,000 U.S.P. anticoagulant units of glycine complex of heparinic acid was instilled into the rectum of a 14 kg. dog. The heparin absorption, as determined from blood samples, was rapid, causing the blood clotting time to double in one-half hour after administration of the drug. After about one hour blood clotting time returned to about the normal value.

(10) Pulmonary absorption (a) from the rabbit lung.—Rabbits, weighing an average of 4 kg. were used. Under sodium pentobarbital anesthesia, the trachea was exposed. Aqueous solutions of sodium heparinate (150 U.S.P. anticoagulant $\mu$/mg.) for control purposes, or glycine heparinic acid (140 U.S.P. anticoagulant $\mu$/mg.) for comparative test purposes were administered to the lungs by tracheal instillation. Blood was withdrawn by cardiac puncture at intervals after administration and the clotting time determined by the aforementioned method of Mayer. Another aliquot of the blood was mixed with sodium citrate (9 volumes blood to 1 volume 0.2 M sodium citrate). The mixture was centrifuged at 120 g. for 6 minutes to obtain the plasma. One ml. sample of the plasma was taken and assayed for lipid clearing activity according to the method as described by Grossman, M. I., J. Lab. Clin. Med., 43, 445 (1954), using a 50% cocoanut oil emulsion diluted 1:50 with water as substrate. Turbidity changes were read at 700 nm on the Beckman DU spectrophotometer.

Control rabbits which received sodium heparinate at a dose level of 2000 U.S.P. anticoagulant units per kg. of body weight showed no increase in systemic anticoagulant or lipolytic activity. On the other hand, the rabbits which received glycine heparinic acid complex at a dose level of 2000 U.S.P. anticoagulant units per kg. of body weight showed an increase in both systemic anticoagulant and lipolytic activities. The blood-clotting time was raised to 2-3 times the normal value an hour after administration. The peak lipolytic activity paralleled the anticoagulant activity; a lipolytic activity of 4 times the normal value was observed one hour after administration. Anticoagulant activity decreased to normal within 6 hours whereas the increased plasma lipolytic activity was sustained for more than 6 hours.

(b) From the dog lung.—Absorption of heparinic acid complexes from dog lungs was determined by withdrawing blood samples from the femoral vein and using the same method of analysis as used for rabbits. An increase in systemic anticoagulant and lipolytic activities occurred in the dogs which received glycine heparinic acid at a dose of 3000 U.S.P. anticoagulant units per kg. of body weight by tracheal intubation. Within an hour after the administration of the drug, the whole blood clotting time was prolonged significantly; a value exceeding 360 minutes was observed. Simultaneously, the lipolytic activity was raised approximately 8–12 times above the normal value. In general, increased anticoagulant activity was sustained for a period of at least 5 hours. The peak lipolytic activity was noted at the second hour after administration, following which it gradually declined. Significantly increased lipolytic activity was still observable 6 hours after administration of the drug.

Control experiments in which sodium heparinate was used showed no increase in systemic anticoagulant activity. There was an increase in lipolytic activity but this increase was small compared to that obtained on dogs which received glycine heparinic acid. The results are tabulated as follows:

TABLE VII.—ABSORPTION OF GLYCINE HEPARINIC ACID AND SODIUM HEPARINATE FROM THE DOG LUNG

| Material administered | Glycine heparinic acid | | Control, sodium heparinate | |
|---|---|---|---|---|
| Dog weight kg | 13.1 | 15.9 | 14.9 | 17.0 |
| Zero blood clotting time | 8'15" | 7'00" | 8'10" | 8'30" |
| Clearing units | 0.45 | 0.20 | 0.25 | 0.38 |
| Blood clotting time (1 hour) | >360' | >360' | 8'30" | 9'00" |
| Clearing units | 3.58 | 2.49 | 0.33 | 0.36 |
| Blood clotting time (2 hours) | >300' | >300' | 8'20" | |
| Clearing units | 3.84 | 2.59 | 0.72 | |
| Blood clotting time (3 hours) | >240' | >240' | 8'30" | 8'05" |
| Clearing units | 1.96 | 1.85 | 1.00 | 0.34 |
| Blood clotting time (4 hours) | >180' | >180' | 8'45" | 8'45" |
| Clearing units | 1.75 | 2.15 | 1.66 | 0.57 |
| Blood clotting time (5 hours) | 32'00" | >120' | 8'23" | 7'35" |
| Clearing units | 1.27 | 1.22 | 1.37 | 0.56 |
| Blood clotting time (6 hours) | 15'00" | 28'00" | | |
| Clearing units | 1.31 | 1.35 | | |

NOTE.—Dose—3,000 U.S.P. anticoagulant $\mu$/kg.

REPRESENTATIVE COMPOSITIONS

Preparation A—Enteric coated tablets

| | Pts. by wt. |
|---|---|
| Glycine complex of heparinic acid (120 U.S.P. anticoagulant μ/mg.) | 140 |
| Binder (Avicel) | 120 |
| Lubricant (Stero-tex) | 90 |

Coating—Cellulose acetate phthalate as required.

Tableted to contain 25,000 U.S.P. anticoagulant units per tablet.

Preparation B—Uncoated tablets for gastrointestinal administration

| | Pts. by wt. |
|---|---|
| (1) Glycine complex of heparinic acid (120 U.S.P. anticoagulant units/mg.) | 250 |
| Polyvinylpyrrolidone | 65 |

Tableted to contain 25,000 U.S.P. anticoagulant units per tablet. Same tablets may be given an enteric coating if desired.

| | Pts. by wt. |
|---|---|
| (2) Glycine heparinic acid (118 U.S.P./mg.) | 70 |
| Corn starch | 3.5 |

Mixed with binder and lubricant granulated with polyvinylpyrrolidone, and tableted to provide tablets containing about 12,500 U.S.P. anticoagulant units each. Same tablets may be given enteric coating if desired.

Preparation C—Uncoated tablets, e.g. for buccal or sublingual use

| | Pts. by wt. |
|---|---|
| Glycine complex of heparinic acid (120 U.S.P. anticoagulant μ/mg.) | 125 |
| Carbowax 6000 | 125 |

Tableted to contain 25,000 U.S.P. anticoagulant units per tablet.

Preparation D—Suppository composition

| | Pts. by wt. |
|---|---|
| Glycine complex of heparinic acid | 150 |
| Cocoa butter | 400 |
| Water | 100 |

Mixed and formed into suppositories containing 25,000 U.S.P. anticoagulant units each.

Preparation E—Pharmaceutical solutions

Glycine complex of heparinic acid is dissolved in distilled water to provide 10%, 20%, 30%, 40% and 50% solutions. Similar solutions are made up using 1% by weight saline as the diluent. These solutions may be placed in plastic squeeze bottles of volume sufficient to provide e.g., 10,000, 15,000 and 25,000 U.S.P. anticoagulant units. The bottles may be provided with spray nozzles for nasal spray purposes or with elongated nozzles for enema use. An inhalant spray composition may be placed in a bottle containing a sufficient amount of "Freon" as a propellant.

The disclosure herein should not be taken as a recommendation to use the disclosed invention in any way without full compliance with food and drug laws and other laws and governmental regulations which may be applicable.

We claim:

1. A therapeutic composition comprising a pharmaceutically acceptable carrier selected from the group consisting of carriers for enteric coated, buccal, or sublingual pills, lozenges, tablets, capsules and powders, carriers for nasal mists and inhalants, carriers for rectal, urethral and vaginal suppositories, ointments and enemas, and a water-soluble active heparinoid complex having anticoagulant and/or anti-lipemic activity absorbable through mucous membranes, selected from the group consisting of (a) a complex of a heparinoid having free acid groups with a non-toxic amino acid having a pI value below about 9.7, and (b) a complex of a heparinoid having free acid groups with a non-toxic organic base having a $pK_b$ value in the range of from 7.0 to 12.5.

2. A heparinoid complex in a pharmaceutical carrier as defined in claim 1 wherein the heparinoid having free acid groups and forming the complex with the amino acid or base is heparinic acid.

3. A heparinoid complex as defined in claim 1 wherein the heparinoid having free acid groups and forming the complex with the amino acid or base is dextran sulfuric acid.

4. A heparinoid complex as defined in claim 1 wherein the heparinoid having free acid groups and forming the complex with the amino acid or base, is a carboxymethyl ester of heparinic acid.

5. A heparinoid complex in a pharmaceutical carrier as defined in claim 1 wherein the heparinoid having free acid groups, and forming the complex with the amino acid or base, is an acid heparinate having a portion of the acid groups of the heparinic acid molecule satisfied by a strongly basic cation.

6. A complex in a pharmaceutical carrier as defined in claim 1 of heparinic acid having a portion of the acid groups of the heparinic acid molecule satisfied by a strongly basic cation and the remainder of the said acid groups complexed with a non-toxic organic base having a $pK_b$ value above 7.0.

7. A complex in a pharmaceutical carrier as defined in claim 1 of heparinic acid and an amino acid selected from the group consisting of aspartic acid, glutamic acid, anthranilic acid, p-aminobenzoic acid, asparagine, glycine, glutamine, valine and β-alanine.

8. A complex in a pharmaceutical carrier as defined in claim 1 of heparinic acid and nicotinamide.

9. A complex in a pharmaceutical carrier as defined in claim 1 of heparinic acid and purine.

10. A complex in a pharmaceutical carrier as defined in claim 1 of heparinic acid and DL-aspartic acid.

11. A complex in a pharmaceutical carrier as defined in claim 1 of heparinic acid and L-glutamic acid.

12. A complex in a pharmaceutical carrier as defined in claim 1 of heparinic acid and DL-asparagine.

13. A complex in a pharmaceutical carrier as defined in claim 1 of heparinic acid and glycine.

14. A complex in a pharmaceutical carrier as defined in claim 1 of heparinic acid and anthranilic acid.

15. A complex in a pharmaceutical carrier as defined in claim 1 of heparinic acid and p-aminobenzoic acid.

16. A complex in a pharmaceutical carrier as defined in claim 1 of dextran sulfuric acid and glycine.

17. An enteric-coated composition comprising a heparinoid complex defined by claim 1 and a pharmaceutically acceptable carrier therefor.

18. An enteric-coated tablet containing a complex of heparinic acid and a non-toxic amino acid having an isoelectric point pI below about 0.7, said complex being present in sufficient amount to provide anticoagulant activity of at least about 500 U.S.P. anticoagulant units.

19. An enteric-coated tablet containing a complex of heparinic acid and a non-toxic organic base having a $pK_b$ value in the range of about 7.0 to 12.5, said complex being present in sufficient amount to provide anticoagulant activity of at least about 500 U.S.P. anticoagulant units.

20. The composition defined in claim 1 wherein the carrier comprises a pharmaceutically acceptable solvent for said heparinoid complex.

21. The composition of claim 20 wherein the solvent is water or other aqueous liquid and the composition is in a form suitable for dispensation as an inhalant spray or mist.

22. The composition of claim 1 wherein the carrier is at viscous fluid and the composition is in suppository form.

23. The composition of claim 1 in sublingual tablet or powder form.

24. A method for obtaining anticoagulant and/or antilipemic action in the blood of a mammal comprising administering to a mucous membrane of said mammal an effective amount of a composition containing a complex of a heparinoid acid and a complexing agent selected from the group consisting of (a) a non-toxic amino acid having a pI value below about 9.7, and (b) a non-toxic organic base having a $pK_b$ value in the range of from 7.0 to 12.5.

25. The method of claim 24 wherein the heparinoid complex is administered to the buccal or sublingual regions of the mouth.

26. The method of claim 24 wherein the heparinoid complex is administered in the form of an enteric-coated composition for passage through the stomach and absorption in the intestine.

27. The method of claim 24 wherein the heparinoid complex is administered to a mucous membrane of the respiratory system.

28. The method of claim 24 wherein the heparinoid complex is administered rectally.

29. The method of claim 24 wherein the heparinoid complex is administered by pulmonary route for absorption in the lung.

References Cited

UNITED STATES PATENTS

| | | | |
|---|---|---|---|
| 2,656,298 | 10/1953 | Loewe | 424—183X |
| 3,062,716 | 11/1962 | Montandraud | 424—183 |
| 3,088,868 | 5/1963 | Windsor | 424—183X |
| 3,126,320 | 3/1964 | Morii et al. | 424—183X |
| 3,232,833 | 2/1966 | Riviere | 424—183 |
| 3,482,014 | 12/1969 | Koh | 424—183X |
| 3,506,642 | 4/1970 | Koh et al. | 424—183X |
| 3,510,561 | 5/1970 | Koh | 424—183 |

OTHER REFERENCES

Windsor et al. Amer. J. Medicine 37:408–416, September 1964, "An Investigation of Routes of Administration of Heparin Other Than Injection."

SHEP K. ROSE, Primary Examiner